(12) United States Patent
Molenaar

(10) Patent No.: US 7,927,035 B2
(45) Date of Patent: Apr. 19, 2011

(54) PREMIUM PERFORMANCE BALL JOINT AND SYSTEM

(75) Inventor: Kelly Molenaar, Kalamazoo, MI (US)

(73) Assignee: Howe Racing Enterprises, Beaverton, MI (US)

( * ) Notice: Subject to any disclaimer, the term of this patent is extended or adjusted under 35 U.S.C. 154(b) by 0 days.

(21) Appl. No.: 10/050,834

(22) Filed: Jan. 15, 2002

(65) Prior Publication Data

US 2003/0133745 A1    Jul. 17, 2003

(51) Int. Cl.
*F16C 11/00*    (2006.01)
(52) U.S. Cl. .......................................... 403/77; 403/126
(58) Field of Classification Search .................. 403/126, 403/141, 143, 77, 120, 135
See application file for complete search history.

(56) References Cited

U.S. PATENT DOCUMENTS

| | | | | |
|---|---|---|---|---|
| 2,559,857 A | * | 7/1951 | Edwards | 403/134 |
| 2,848,260 A | * | 8/1958 | Moskovitz | 403/126 |
| 2,900,196 A | * | 8/1959 | Nienke | 403/134 |
| 2,954,993 A | * | 10/1960 | Scheublein, Jr. et al. | 403/134 |
| 3,061,344 A | * | 10/1962 | Gray et al. | 403/125 |
| 3,103,377 A | * | 9/1963 | Scheublein, Jr. et al. | 403/77 |
| 3,239,256 A | * | 3/1966 | Carter | |
| 3,415,551 A | * | 12/1968 | Korecky et al. | 403/126 |
| 4,120,597 A | * | 10/1978 | Millard | 403/138 |
| 4,134,701 A | * | 1/1979 | McEowen | 403/138 |
| 4,568,216 A | * | 2/1986 | Mizusawa et al. | 403/122 |
| 4,666,329 A | | 5/1987 | Hugelmann | |
| 5,435,652 A | * | 7/1995 | Howard | |
| 5,564,853 A | * | 10/1996 | Maughan | 403/135 |
| 5,816,731 A | * | 10/1998 | Howard | 403/120 |
| 5,885,022 A | * | 3/1999 | Maughan et al. | 403/135 |
| 6,250,840 B1 | * | 6/2001 | Urbach et al. | 403/135 |
| 6,382,865 B1 | * | 5/2002 | Paxman | 403/131 |
| 6,550,120 B1 | * | 4/2003 | Maughan et al. | 403/118 |
| 6,742,955 B2 | * | 6/2004 | Moses | 403/135 |

FOREIGN PATENT DOCUMENTS

| | | | |
|---|---|---|---|
| DE | 364495 | * | 11/1922 |
| FR | 1049045 A | * | 12/1953 |
| FR | 1399174 | * | 12/1965 |

* cited by examiner

*Primary Examiner* — Victor MacArthur
(74) *Attorney, Agent, or Firm* — Robert L. McKellar; McKellar IP Law, PLLC

(57) ABSTRACT

Ball joints, systems in which they are used, and suspension systems in which the ball joint systems are employed. The ball joints, systems and suspension mechanisms are especially useful for racing vehicles in which premium performance is desired. As an additional feature, the products of this invention are especially appreciated because of the ability to quickly and easily replace or change them.

19 Claims, 4 Drawing Sheets

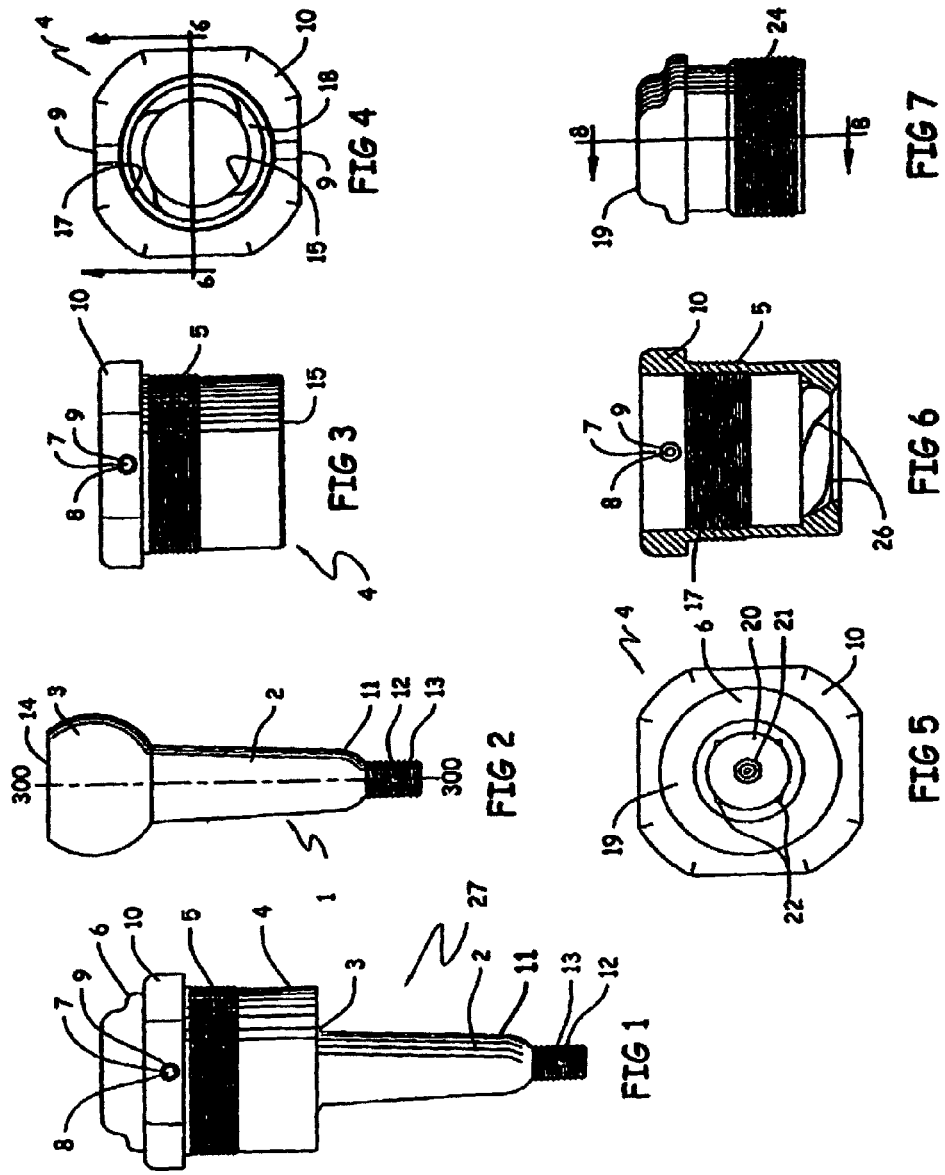

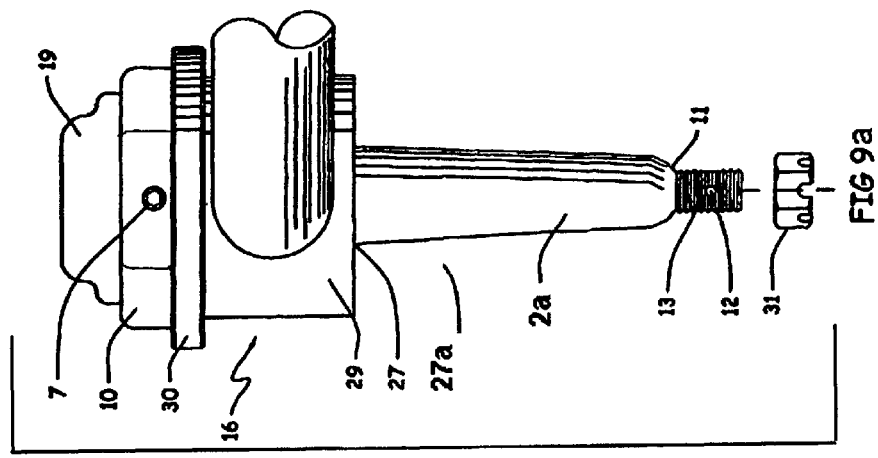
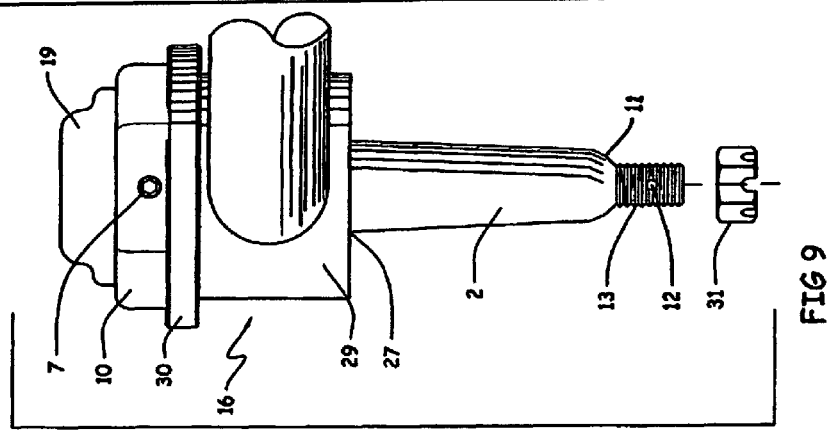
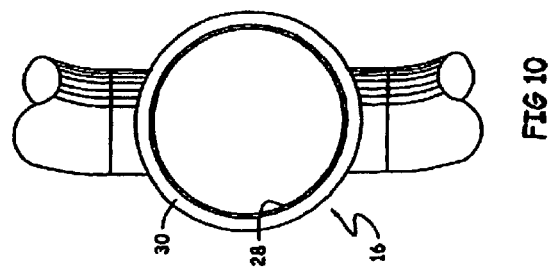

PREMIUM PERFORMANCE BALL JOINT AND SYSTEM

The invention disclosed and claimed herein deals with premium performance ball joints, systems in which they are used, and suspension systems in which the ball joint systems are employed. The ball joints, systems and suspension mechanisms are especially useful for racing vehicles in which premium performance is desired. As an additional feature, the products of this invention are especially appreciated because of the ability to quickly and easily replace or change the ball and shaft (ball stud combination) in the ball joints. The ball stud is what is damaged in accidents, and, it wears out first from normal use. Thus, the ability to change the ball stud rather than changing the entire ball joint is a decided advantage of this invention.

Unlike the lower ball joints, upper ball joints do not have the load between the sprung mass of the vehicle and the suspension spring to keep them seated. Most prior art ball joints used in the upper ball joint position use an internal spring over the ball and in the void space above the ball to hold the ball in place. In high cornering situations, the lateral force on the ball joint creates sufficient force to compress the spring and unseat the ball. This problem makes it impossible to maintain the optimum camber in the tire to maximize the tire contact patch on the roadway. This movement also causes minor directional changes in the automobile steering that are detrimental to stability of the automobile. Thus, the premium performance aspect of this invention is based on the fact that prior art ball joints used for the same applications, all have a mechanical means for applying pressure to the ball within the ball joint to accommodate wear as the ball joint is in use, while the ball joint of this invention has no such mechanical means. The lubricants that are commonly used in these types of ball joints provide the pressure required within the inventive ball joint for accommodating the wear of the ball joints of this invention. The result is a ball that has minimal restriction in movement because of the reduction in friction and is therefore essentially "free wheeling" within the housing in which it is contained, thus, providing ease of steering. Original equipment manufactured ball joints of the prior art create inconsistent amounts of resistance to suspension movement, most frequently around twenty pounds, while the ball joints of this invention have less than one pound of resistance. This is important to race drivers, as shock and spring rates are critical to within five pounds. It is not conceivable that automobile handling advantages could be built into the automobile by making small spring and shock rate changes while the ball joints are gradually losing resistance, or "freeing up" as they wear. The ball joints of this invention greatly reduce the "moving resistance target" caused by prior art tight ball joints.

BACKGROUND OF THE INVENTION

It is well know that ball joints and systems employing them are used in front wheel suspension of automotive vehicles. The ball joint lends flexibility for steering the wheels while accommodating changes in angles between the wheel and the suspension members. In conventional ball joints, a pin or shaft on which the wheel is mounted carries a ball, which is rigid with the shaft, the ball being housed in a housing wherein the ball is seated and retained. During both rotation and pivoting of the elongated shaft, the surface of the ball slides over a lining of the housing.

Typically, prior art ball joints are all constructed such that they have an open space or void at the top of the ball, wherein there is typically placed a means for asserting pressure on the top of the ball to accommodate any wear on the ball. Such means are, for example, springs under tension, which are placed on the top of the ball and retained by some kind of insert over the top of the ball. Also known by the inventors herein are ball joints in which the pressure is provided by compressible nylon particles that are situated in the open space and impinge on and essentially surround the exposed top surface of the ball.

All such ball joints require lubrication, and some means is provided to allow for the lubricant to be injected into the housing and onto and around the ball of the ball joint. Further, the ball per se often contains shallow, usually disconnected, channels in which the lubricant can take up residence. These channels help a situation that can occur in the ball joint in which the lubricant, contained within the housing, can block off all air into the housing and create a vacuum within the housing, that provides a lock. This lock is experienced when one tries to put grease into the housing, as the grease gun connector locks onto the grease zerk fitting and cannot be removed. The grooves not only provide a channel for the grease to reach the ball, but they also create vents that allow the grease to enter the ball joint housing and air to escape.

The instant invention eliminates or reduces the above-mentioned problems with ball joints and provides a premium performance ball joint wherein the ball and shaft is easily installed, removable, and easily replaced without having to replace the entire ball joint, and, furthermore, the ball joint system provides premium performance in the operation of automobiles.

THE INVENTION

Thus, this invention deals with novel ball joints, novel systems employing the ball joints, and suspension systems for automotive uses that employ the novel ball joint systems.

More specifically, there is provided a ball joint comprising in combination an elongated shaft having an upper end and a lower end and having a longitudinal axis running through said upper end and said lower end, wherein the elongated shaft has threads on its lower end. There is in addition, a ball rigidly fixed and surmounted on the upper end of the elongated shaft. The ball, at the highest point opposite the attachment of the elongated shaft, has a truncated flat face. There is also a retaining member having an upper surface and a lower end. The retaining member is provided with a lubricating port located in the upper surface of the retaining member. The lubricating port is openly connected to a duct, the duct necessarily providing a passageway for lubricants from the lubricating port to the truncated flat face of the ball. The retaining member is externally threaded on the retaining member lower end.

There is a housing having an outside surface, a middle portion, and a lower end. The housing is internally conformed at the lower end to seat the ball and retain it in the housing, and the seat allows a pivotal movement of the ball about the longitudinal axis of the elongated shaft relative to the housing. The middle portion of the housing is internally threaded to receive the retaining member and the middle portion is externally threaded on the outside surface. Finally, there is a fastening means for fastening the retaining member in the housing.

In another embodiment, there is a combination of the ball joint described just above, and a socket to provide a ball joint system. The socket comprises a cylindrical housing having a wall with an internal surface wherein the internal surface is threaded to receive the housing in it and the socket has a means of attachment for attachment near a terminal end of a carrier for the ball joint system.

Finally, there is an additional embodiment of this invention that is an automotive suspension system incorporating the ball joint systems described just above.

BRIEF DESCRIPTION OF THE DRAWINGS

FIG. 1 is a full view of a ball joint system of this invention that is fully assembled.

FIG. 2 is a full view of the ball and the elongated shaft of this invention.

FIG. 3 is a full view of the housing of this invention

FIG. 4 is a full top view of the housing of this invention without the retaining member in place FIG. 5 is a full top view of the housing of this invention with the retaining member in place.

FIG. 6 is a full cross-sectional view of the housing of FIG. 4 through the lines 6-6 of FIG. 3.

FIG. 7 is a full view of the retaining member of this invention.

FIG. 9 is a full view of a fully assembled ball joint system of this invention and including the socket.

FIG. 9a is a full view of a fully assembled ball joint system similar to the ball joint system of FIG. 9 except that a ball joint with a longer shaft is shown in FIG. 9a;

FIG. 10 is a full top view of the socket of FIG. 9.

DETAILED DESCRIPTION OF THE INVENTION

Figure 11:
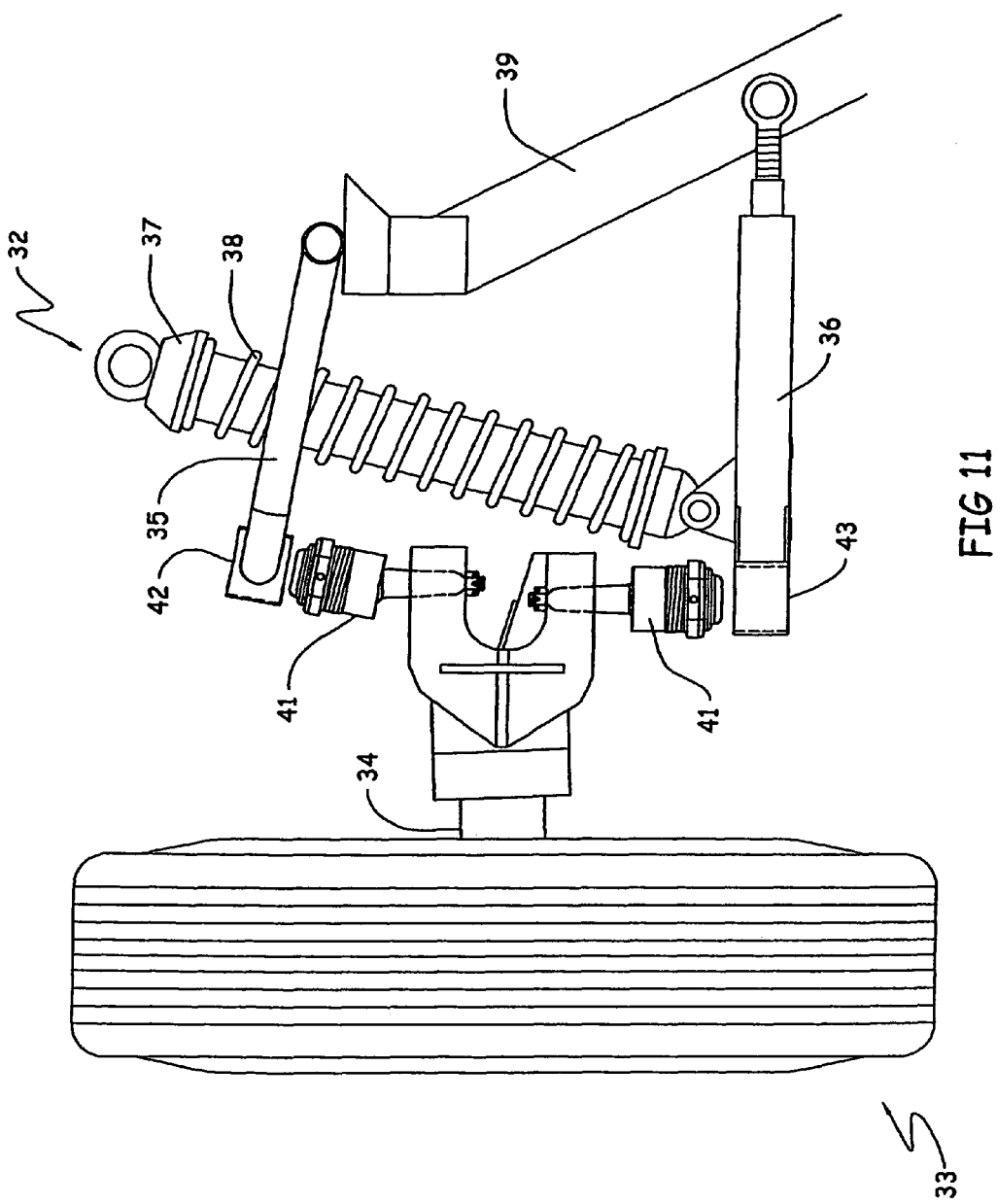
FIG. 11 is a schematic drawing of one type of automotive suspension system showing the use of the ball joint systems of this invention.

Turning now to the Figures, and with reference to FIG. 1, which is a full view of a ball joint system 27 of this invention that is fully assembled. There is shown as the components thereof, an elongated shaft 2, and the ball 3 (only a portion of the bottom of the ball is shown therein), the housing 4, with external threads in an internal cavity therein 5, a retaining member 6, and a fastening means 7, which is a set screw 8 set into a threaded (not shown) opening 9, in an upper flange 10 of the housing 4.

It should be noted that the elongated shaft 2 is threaded at its lower end 11, and that there is an opening 12 though the threaded portion 13 of the elongated shaft 2 to accommodate a cotter pin (not shown), or the like, to retain a nut 31 (see FIG. 9), which in turn retains the elongated shaft 2 in a portion of a suspension system that is discussed below. It is contemplated within the scope of this invention to provide ball joints wherein the shafts 2 are provided in various lengths. Thus, as shown in FIG. 9a, a slightly longer elongated shaft 2a may be substituted for some purposes for elongated shaft 2. The reason for the various lengths is that in racing, it is desirable to alter the suspension angles and positions to affect handling, i.e., roll centers, camber gain and other related geometry. Having ball joints with variable length shafts gives the users an option for altering the suspension geometry of the automobile using the ball joints. Currently, racers will change or alter the spindles to make the same geometry changes, and this provides an increased cost, as the spindles are about 6 to 7 times more expensive than the ball joints of this invention.

FIG. 2 is a full view of the combination 1 of the ball 3 and the elongated shaft 2 without the remainder of the components being shown, for clarification. Thus there is shown the ball 3, the elongated shaft 2, a truncated flat surface 14 at the topmost point of the ball 3, and the threaded portion 13 at the lower end 11, along with the opening 12. What is meant by "longitudinal axis running through said upper end and said lower end" is shown by the line 300-300 in FIG. 2, which indicates the principal axis that the ball 3 would revolve around, it being understood that the ball will tilt from this axis within the housing 4 to provide flexibility in the ability of the ball 3 to coordinate with the suspension systems noted infra, and the degree of movement within the housing 4 is limited only by the contact of the elongated shaft 2 with the lower edge 15 of the housing 4, and/or the connection that the elongated shaft 2 has with the suspension system and the wheel 33 shown in FIG. 11.

It should be noted that the preferred combination 1 of ball 3 and elongated shaft 2 is that in which the two are joined as a unitary component. This combination is manufactured from hardened steel or the like to endure the wear that usually accompanies such devices. The truncated flat surface 14 is provided so that there is a space or void 25 (see FIG. 8) formed above the ball 3 when in the housing 4. The space 25 is intended to contain lubricant, namely, a thickened oil or grease which is not shown in this Figure, but which can be any common lubricant known in the art. Filling the void 25 above the truncated surface 14 allows for pressure to be applied to the ball 3, while in the housing 4, and is employed to help seat the ball in the seat 18 (see FIG. 4) provided at the lower end of the housing 4. The pressure created by lubricants inserted in the void 25 is also a means to help adjust the ball in the housing 4 to accommodate for any wear on the ball 3. As far as is known by the inventors herein, this means of accommodating for wear on the ball 3 is not known independently of mechanical means, or as a sole means for providing such pressure.

The housing 4, which houses and seats the ball 3 is shown in FIG. 3. With reference to this Figure, there is shown the threaded exterior surface 5, which inserts into the socket 16, that is described infra, the lower edge 15, which in this Figure is beveled to fit into the bottom of the socket 16, the flange 10 which is configured such that it can be used to turn the housing 4 into the socket 16, and in this Figure, the flange 10 is shown as a hexagon configuration also any convenient configuration that allows the turning of the housing 4 is contemplated within the scope of this invention. The threaded exterior surface 5 is used to attach the housing to the support arm of a suspension system. This means for attaching the housing to the support arm of the suspension system is external threads 5 on the external surface of the middle portion of the housing. In the side surface of the flange 10, there is shown a fastening means 7 for the housing 4, to retain the retaining member 6 in the housing 4, which fastening means 7 is comprised of a simple set screw combination wherein there is shown the threaded opening 9, into which a set screw 8 is inserted and turned down to complete the fastening. The type of fastening means 7 is not critical in this invention, and any fastening means which will secure the retaining member 6 in the housing 4 and which is fairly simple to use, is acceptable.

With reference to FIG. 4, which is a top view of the housing 4, there is shown the flange 10, the fastening means opening 9, in phantom, the internal threads 17 for accommodating the external threads 18 of the retaining member 6, and the seat 18 for the ball 3, which is located near the bottom edge 15 of the housing 4.

Further, with reference to FIG. 5, which is a top view of the housing 4, wherein there is shown the flange 10, therein is situated in the housing 4, a retaining member 6, wherein there is shown the top 19 of the retaining member 6, a concavity 20 in the top 19, and detachedly fixed in the concavity 20, a grease zerk fitting 21. Generally, such grease zerk fittings 21 are threaded and screwed into a threaded opening and that is contemplated within the scope of this invention as well as any convenient means of inserting and fastening the grease zerk fitting 21. Also shown in this Figure are indentions 22, which are indented in the wall of the concavity 20, which indentions 22 are useful for applying a wrench or some other viable means to turn the retaining member 6 in and out of the housing 4. The indentions 22 are not critical to this invention and can be optionally included in the retaining member 6, and can be configured other than as an indention as shown.

Figure 8:
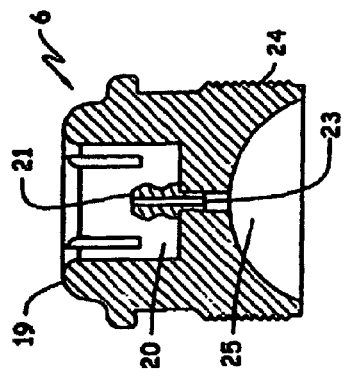
FIG. 8 is a full cross-sectional view of the retaining member of FIG. 7 through the lines 8-8 of FIG. 7.

Reference should also be made to FIG. 6, which is a cross-sectional view of the housing 4, taken through line 6-6 of FIG. 4 wherein there is shown the flange 10, the opening 9, the set screw 8 tail end, the external threads 5, and the internal threads 17, which accommodate the external threads 24 of the retaining member 6 (see also FIGS. 7 and 8).

With further reference to the retaining member 6, reference should be made to FIG. 7, which is a full view of the retaining member 6, showing the top 19 and the external threads 24. FIG. 8 is a full cross-sectional view of the retaining member 6 through line 8-8 of FIG. 7, wherein, there is shown the top 19, the external threads 24, the concavity 20, and the grease fitting 21. Also shown is the duct 23, which allows lubricant applied to the grease fitting 21 to be carried to the void 25 (see FIG. 8), wherein the ball 3 is shown and wherein the majority of the lubricant resides. Also shown in FIG. 6 are the shallow channels 26 which in the prior art ball joints are typically placed into the ball 3, but which in this invention are placed in the interior of the housing 4. The reason for this placement of the shallow channels 26 is primarily cost, as placing the shallow channels 26 in the housing 4, means that expensive machining does not have to be done in the ball 3, which is the part that is replaced more often.

Turning now to FIG. 9, there is shown a full view of the fully assembled ball joint system 27 wherein components shown therein have like numbers for like components as shown in FIG. 1, except, there is shown in addition, the socket 16, into which the ball joint system 27 is screwed pursuant to the internal threads 28 of the socket 16, and the external threads 5 on the housing 4. The socket 16 is comprised of a hollow cylinder housing, which has a sidewall 29 and an upper rim 30. The socket 16 is fastened securely into the support arms of a suspension system of an automobile or truck, which automotive suspension system is illustrated in the schematic drawing of FIG. 11. The ball joint system 27 can be used for both the upper and lower support arms configuration. The fully assembled ball joint system 27 is then turned into the socket 16 and is secured to the socket 16 by any conventional securing means, such as set screws, retainer rings, or the like. Also shown in association with the ball joint system 27 of FIG. 9 is a threaded nut 31 (FIG. 9), which can be turned onto the threads 13 of the elongated shaft 2 for attachment to a support means (axle stud) of a wheel of an automobile, and thereafter, the nut 31 is secured thereon by the insertion of a cotter pin, or the like, through the opening 12.

In FIG. 9a, there is shown a full view of the fully assembled ball joint system 27a similar to ball joint system 27 wherein components shown therein have like numbers for like components as shown in FIG. 9, except, there is shown a ball joint having a longer elongated shaft 2a than the one shown in FIG. 9. The ball joint system 27 may be disassembled and reassembled as ball joint system 27a when it is desired to alter the suspension geometry of the automobile using the ball joint system.

Finally, turning to FIG. 11, there is shown a schematic drawing of one type of automotive suspension system 32, in which there is shown as the main components therein, a fully mounted wheel 33 for the automobile, a support stud (axle) 34 for the wheel 33, wishbone support arms, upper 35, and lower 36, a strut or shock absorber 37, having an surrounding auxiliary spring 38, a support mechanism 39 that is attached to the frame of an automobile (not shown), an upper ball joint system 40, and a lower ball joint system 41, wherein the support arms 35 and 36 do not show as being attached to the lower and upper ball joint systems, 40 and 41, respectively, in order to more clearly show the total configuration of the suspension system. The openings in the support arms 35 and 36 are shown in phantom as 42 and 43, respectively. In actual use, the sockets 16 for both the upper 40 and the lower 41 ball joint systems would normally be inserted in the openings 42 and 43 respectively.

Figure 13:
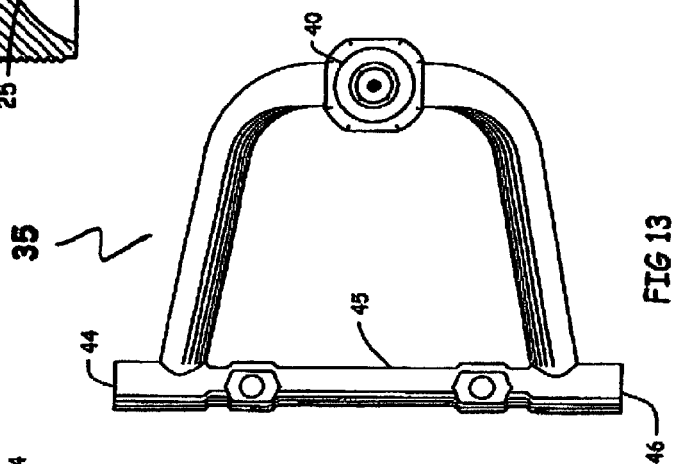
FIG. 13 is a full top view of the wishbone support arm of FIG. 12.
Figure 12:
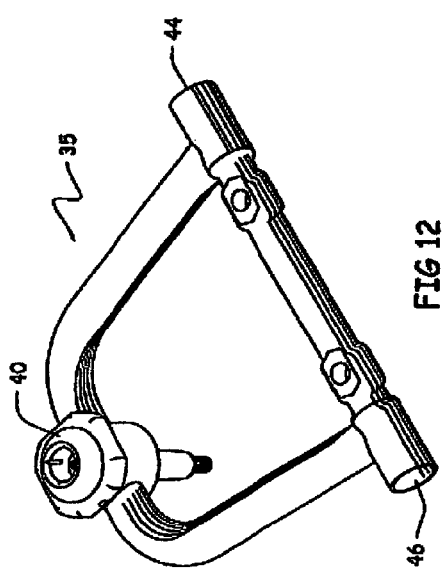
FIG. 12 is a full view in perspective of a portion of the suspension system of FIG. 11, wherein there is shown a wishbone support arm containing a ball joint system of this invention.

FIG. 12 is a full view in perspective of a wishbone support arm 35 or 36 with the ball joint system, either the upper 40, or the lower 41, inserted therein. In addition, FIG. 13 shows a full top view of the wishbone of FIG. 12, wherein the ball joint system 40 or 41 is clearly visible. The support arms 35 and 36 are securely attached to the frame of the vehicle by the bar 45, while the respective ends 44 and 46 are constructed to allow the rotation of the arms 35 and 36 per se to rotate around the bar 45 in an up and down mode for the support arms pursuant to the movement of the wheel 33 and support stud 34 while in use the vehicle is in use. This is also shown in FIG. 13.

What is claimed is:

1. A metal ball joint for use with a pressurized lubricant, the ball joint comprising in combination:
    (i) an elongated shaft having an upper end and a lower end, said elongated shaft being threaded on the lower end;
    (ii) a ball rigidly fixed and surmounted on the upper end of the elongated shaft, said ball having a curved surface, and further having a truncated flat face at the highest point opposite the upper end of the elongated shaft;
    (iii) a housing having an outside surface, an upper flange with a threaded opening, a middle portion, and a lower end, said housing further having a curved seat formed at the lower end of the housing to seat and engage a first portion of the curved surface of the ball adjacent the elongated shaft and an opening formed in the seat for passage therethrough of the elongated shaft but not permitting passage therethrough of the ball such as to permit pivotal movement of the elongated shaft relative to the housing, said middle portion of the housing having an internal thread and said middle portion further comprising an external thread for attaching the housing to a socket;
    (iv) a retaining member having an upper surface and a lower end, said retaining member having a curved seat formed at the lower end thereof to seat and engage a second portion of the curved surface of the ball adjacent the truncated flat surface thereof and a lubricating port located in the upper surface of the retaining member, the lubricating port being in communication with a duct, said duct providing a passageway from the lubricating port to the truncated flat face of the ball, capable of permitting the admission of a pressurized lubricant, such that the pressurized lubricant exerts pressure against the retaining member and the truncated flat face of the ball to maintain pressure on the ball to maintain the ball against the seat of the housing, said retaining member having an external thread on said lower end thereof, the external thread being engageable with the internal thread of the housing to trap the ball within the housing and the retaining member; the retaining member being capable of maintaining a seal between the ball and the housing via the pressure of the lubricant on the truncated flat face of the ball; and (v) a set screw removably threaded into a the threaded opening in the upper flange of the housing into engagement with the retaining member such that the retaining member can be selectively removed from the housing by removal of the set screw.

2. An automotive suspension system wherein there is provided an upper ball joint system comprising a first metal ball joint as claimed in claim 1 and a lower ball joint system comprising a second metal ball joint as claimed in claim 1.

3. A ball joint as claimed in claim 1, where said housing further comprises an external thread on the outside surface, said external thread being capable of attaching the housing to a support arm of the suspension system.

4. A ball joint as claimed in claim 1, wherein said middle portion of said housing further comprises a flange that can be secured to the support arm by at least one detachable pin for attaching the housing to the support arm of the suspension system.

5. A ball joint as claimed in claim 4, wherein the detachable pin is a bolt secured by a nut.

6. A ball joint as claimed in claim 1, further comprising means for attaching the housing to the support arms of the suspension system comprising a compression fit of the housing into openings in the support arms.

7. A ball joint as claimed in claim 1 wherein the housing is an integrally formed unitary component.

8. A ball joint as claimed in claim 1 wherein the retaining member is an integrally formed unitary component.

9. A ball joint as claimed in claim 1 wherein the set screw engages the upper surface of the retaining member.

10. A ball joint as claimed in claim 1 further including a socket, said socket comprising a cylindrical body having an internal surface, said internal surface being threaded to receive the external thread of said housing therein.

11. A ball joint as claimed in claim 1 wherein the housing further comprises a top surface and said retaining member further comprises a flange abutting the top surface of the housing when the external threads of the retaining member are fully engaged with the internal threads of the housing.

12. A ball joint as claimed in claim 1 wherein the external threads of the retaining member and the internal threads are disposed partially around the ball when the external threads of the retaining member are fully engaged with the internal threads of the housing.

13. A metal ball joint comprising in combination:
(i) a ball stud having an elongated shaft portion having an upper end and a lower end, a threaded portion at the lower end for engaging a drive member, and a ball portion at the upper end having a curved surface;

(ii) a unitary housing having an outside surface having an external thread formed thereon, said external thread being capable of attaching the housing to a suspension system; a lower end having a lower seat formed therein to seat a first portion of the curved surface of the ball portion; an opening formed in the lower seat for passage therethrough of the elongated shaft portion but not permitting passage therethrough of the ball portion such as to permit pivotal movement of the elongated shaft portion relative to the housing; an inside surface having an internal thread formed thereon;

(iii) a unitary retaining member having an upper end having a upper seat formed therein to seat a second portion of the curved surface of the ball portion; a void in the upper seat between the ball portion and the retaining member; a lubricating duct formed in the retaining member providing a passageway capable of permitting the admission of a pressurized lubricant into the void; an external thread formed on the retaining member, the external thread being engageable with the internal thread of the housing, the retaining member and the housing being capable of trapping the ball portion between the upper seat and the lower seat and maintaining a seal between the ball portion and the housing via pressure of the lubricant in the void on the ball portion; and (iv) a set screw capable of extending from the housing into engagement with the upper surface of the retaining member to prevent relative rotational motion therebetween.

14. A ball joint as claimed in claim 13, where said unitary housing further comprises an external thread on the outside surface, said external thread being capable of attaching the housing to a support arm of the suspension system.

15. A ball joint as claimed in claim 13, wherein said housing further comprises a flange that can be secured to the support arm by at least one detachable pin for attaching the housing to the support arm of the suspension system.

16. A ball joint as claimed in claim 13, further comprising means for attaching the housing to a support arms of the suspension system comprising a compression fit of the housing into openings in the support arms.

17. A ball joint as claimed in claim 13, wherein the retaining member has a lubricating port located in the upper surface thereof, the lubricating port being in communication with said lubricating duct capable of permitting the admission of a said pressurized lubricant from said lubricating port to said lubricating duct, such that the pressurized lubricant-exerts pressure against the retaining member and the truncated flat face of the ball to maintain pressure on the ball to maintain the ball against the seat of the housing.

18. A ball joint as claimed in claim 13, wherein the housing further comprises a top surface and said retaining member further comprises a flange abutting the top surface of the housing when the external threads of the retaining member are fully engaged with the internal threads of the housing.

19. A ball joint as claimed in claim 13, wherein the external threads of the retaining member and the internal threads are disposed partially around the ball when the external threads of the retaining member are fully engaged with the internal threads of the housing.

* * * * *